P. A. FISKER.
MOTORCYCLE.
APPLICATION FILED MAY 4, 1918.
1,331,747.
Patented Feb. 24, 1920.
2 SHEETS—SHEET 2.
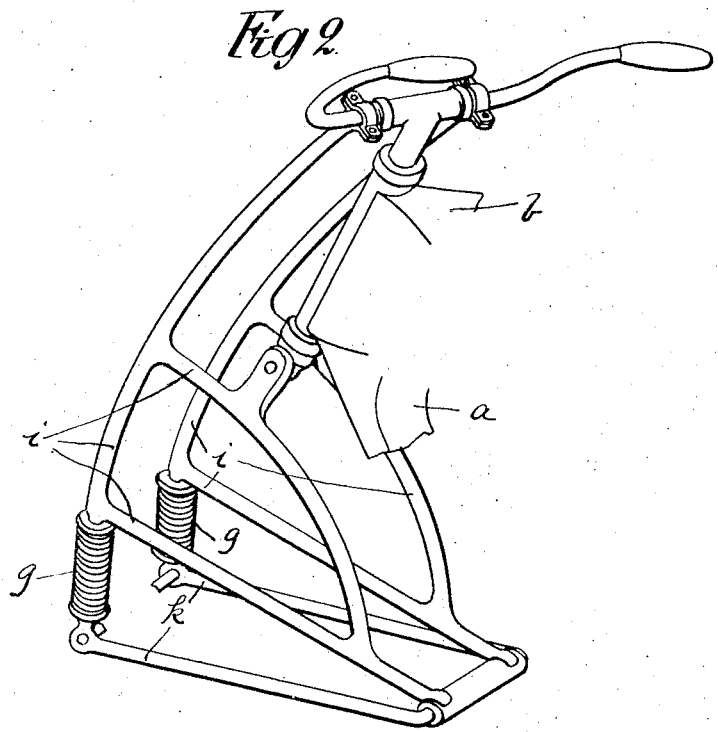
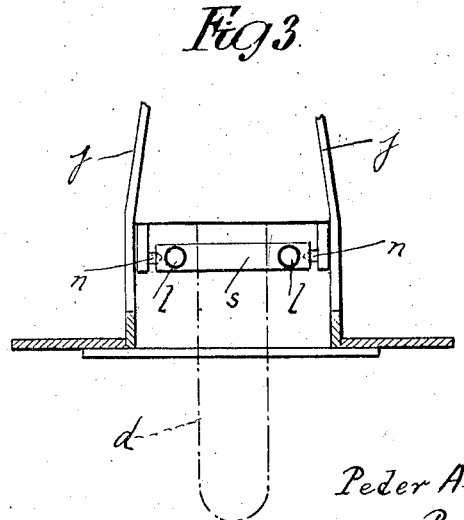
Inventor:
Peder Andersen Fisker
By
Attorney.

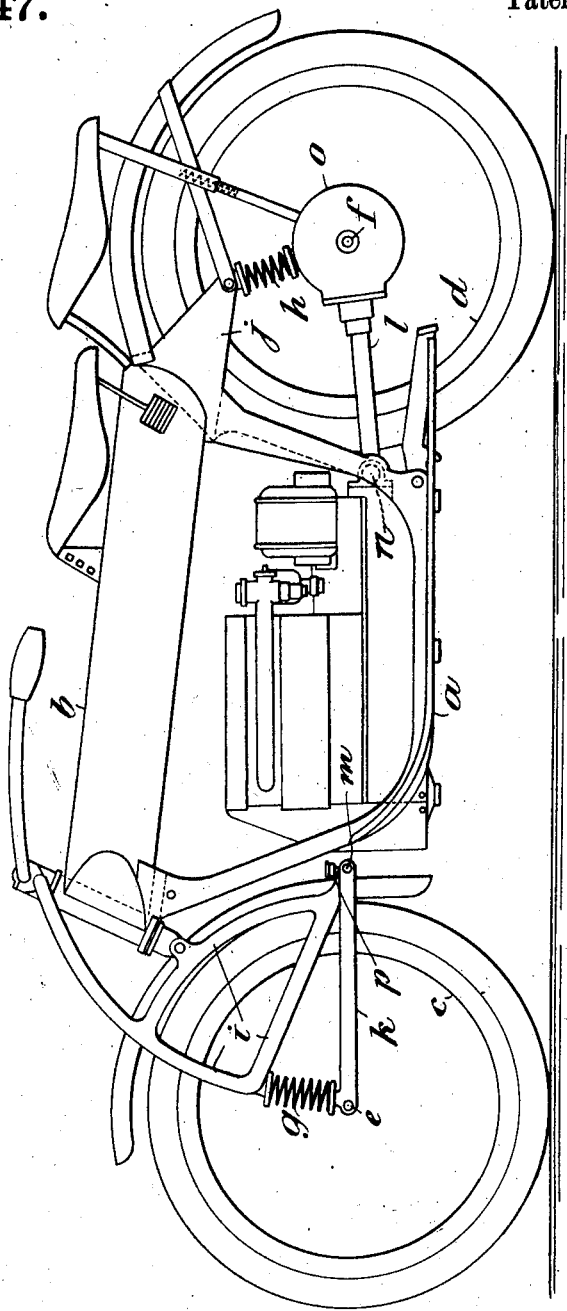

UNITED STATES PATENT OFFICE.

PEDER ANDERSEN FISKER, OF COPENHAGEN, DENMARK.

MOTORCYCLE.

1,331,747.  Specification of Letters Patent.  Patented Feb. 24, 1920.

Application filed May 4, 1918. Serial No. 232,671.

*To all whom it may concern:*

Be it known that I, PEDER ANDERSEN FISKER, machine manufacturer, a subject of the Kingdom of Denmark, residing at No. 30, Peder Bangsvej, in the city of Copenhagen and Kingdom of Denmark, have invented certain new and useful Improvements in Motorcycles; and I do hereby declare the following to be a full, clear, and exact description of the invention, such as will enable others skilled in the art to which it appertains to make and use the same.

This invention relates to motor-cycles and is chiefly characterized in that the front and rear wheels of the cycle are resiliently connected with the steering device of the cycle and with rigid frame parts respectively by means of springs arranged at both sides of the wheels, the upper ends of said springs being fixed to parts of the steering devices which are immovable when the springs are working, while the lower ends are fixed to members connected with the hubs of the wheels, whereby the said members are caused to rock during the compression and extension of the springs about fulcrums situated outside the wheels and placed in a fixed relation to the steering device, and rigid frame parts.

An embodiment of the invention is illustrated in the accompanying drawing, in which:

Figure 1 is a side elevation of a motor cycle constructed in accordance with the invention;

Fig. 2 is a perspective view of the steering fork and associated parts; and

Fig. 3 is a fragmental vertical section, showing the pivotal connection of the rear wheel with the frame, the section being taken on line A—B, Fig. 1.

Referring more particularly to the drawing, the frame of the cycle, as therein represented, is of the type shown and described in my companion application, Serial No. 232,670, filed concurrently herewith, and comprises a substantially U-shaped lower part $a$ and an upper part which is preferably formed by the fuel container $b$, the part $a$ being composed of two counterpart spaced members. The steering frame, best shown in Fig. 2, comprises two triangular, or approximately triangular side frames $i$, which are disposed at opposite sides of the front wheel $c$ and which have their front members extended upward and connected to the steering post, the upper members of said frames being connected to the lower end of the post in some suitable manner. The lower members of the frames are extended rearward and connected at their free ends by a sleeve or the like (Fig. 2), in which the rear ends of a pair of links $k$ are pivoted, as indicated at $m$. The front ends of these links $k$ are pivoted to the hub $e$ of the wheel $c$, and between said hub and the adjacent corners of the side frames $i$ is disposed at opposite sides of the wheel a pair of springs $g$, the arrangement being such that the links $k$ are capable of a swinging or rocking movement about the pivotal connection $m$ which latter, as will be understood, is located beyond wheel $c$.

The rear wheel $d$ has attached to its hub $f$ a gear case $o$, containing the usual bevel gears, motion being transmitted to said gears by means of a shaft (not shown) having a suitable universal joint connection with the motor shaft and arranged in one of a pair of sleeves $l$ which are located at opposite sides of the wheel and are integrally connected at their forward ends by a cross-piece $s$ hereinafter referred to. The sleeve containing said transmission shaft is fixed at its rear end to the gear case $o$ and at its front end to the cross-piece $s$ which is disposed between the vertical rear portions $j$ of the two spaced members of frame $a$ and which is pivotally connected at its opposite ends to the portion of the motor-casing as indicated at $n$, (Figs. 1 and 3). The other sleeve or tube $l$ is similarly attached at its front end to the cross-piece $s$, but is connected at its rear end to the brake case, which, however, is concealed behind the gear case $o$ in Fig. 1 and, hence, does not appear in that figure. The above-mentioned frame parts $j$ are formed at their upper ends with integral, rearwardly-extending lugs as shown in Fig. 1, and between the extremities of these lugs and the tops of the gear and brake cases are interposed springs $h$, which are similar to and provided for the same purpose as, the springs $g$, *i. e.*, to allow for a relative yielding movement between the frame and the wheel, the mounting of the sleeves or tubes $l$ in the manner above described enabling said sleeves to swing or rock about their pivots $n$ which are likewise located beyond the corresponding wheel.

The pivot $m$ which connects the adjacent ends of the parts *i* and *k*, and about which said parts rock, may be lubricated from a single central lubricant cup *p*, as indicated in Fig. 1, said cup being omitted from Fig. 2.

I claim as my invention:

1. In a motor cycle, the combination, with the front and rear wheels, the frame and the steering gear mounted in the frame; of a motor casing mounted upon the lower portion of the frame; front and rear pairs of members disposed at opposite sides of said wheels and having their outer ends connected with the hubs of the corresponding wheels the inner ends of the front members being mounted on pivots which are located immediately beyond the front wheel, and the inner ends of the rear members being pivotally connected with the rear end of the motor casing at a point immediately beyond the rear wheel and front and rear pairs of springs arranged at opposite sides of said wheels directly above the hubs thereof for enabling relative movement between said wheels and said steering gear and frame, the front pair of springs being interposed between the outer ends of the front pair of members and the adjacent portion of said steering gear, and the rear pair of springs being interposed between the outer ends of the rear pair of members and the adjacent portion of said frame.

2. In a motor cycle, the combination, with the front wheel and the frame; of a steering gear mounted in the frame and comprising a pair of substantially triangular side frames disposed at opposite sides of the front wheel, a steering post arranged between the side frames, extensions on the front members of the side frames connected to the steering post, and rearwardly-projecting extensions on the bottom members of said side frames terminating beyond said front wheel, a pair of links disposed at opposite sides of the front wheel, a pivotal connection between the rear ends of said links and those of the rearwardly-projecting extensions of said bottom members, the links having their front ends connected to the hub of said wheel, and springs interposed between the said front ends of the links and those of the said bottom frame members; substantially as described.

3. In a motor cycle, the combination, with the front wheel and the frame; of a steering gear mounted in the frame and comprising a pair of substantially triangular side frames disposed at opposite sides of the front wheel and a steering post arranged between the side frames and with which the upper ends of the latter are connected, a pair of links disposed at opposite sides of said front wheel and having their front ends connected to the hub thereof, a single pivotal connection between the rear ends of the links and those of the side frames, said connection being located beyond said front wheel, a device disposed centrally of said connection for lubricating the same, and springs interposed between the front ends of the links and the side frames; substantially as described.

In testimony whereof, I affix my signature.

PEDER ANDERSEN FISKER.